United States Patent [19]

Mazet

[11] Patent Number: 5,321,504
[45] Date of Patent: Jun. 14, 1994

[54] MODIFIED BLACK-LEVEL REGULATION BASED ON WARM UP DETECTION OF CRT

[75] Inventor: Roland Mazet, Grenoble, France

[73] Assignee: SGS-Thomson Microelectronics S.A., Saint-Genis Pouilly, France

[21] Appl. No.: 106,057

[22] Filed: Aug. 13, 1993

[30] Foreign Application Priority Data

Aug. 27, 1992 [FR] France .................. 92 10502

[51] Int. Cl.⁵ .............. H04N 9/16; H04N 5/68; H04N 9/72; H04N 5/16
[52] U.S. Cl. ............................ 348/379; 348/697
[58] Field of Search ........... 358/171, 172, 173, 34, 358/74, 243, 242; H04N 5/16, 5/18, 9/72, 5/68, 9/16

[56] References Cited

U.S. PATENT DOCUMENTS

| | | | |
|---|---|---|---|
| 4,450,476 | 5/1984 | Tallant, II | 358/74 |
| 4,516,152 | 5/1985 | Willis | 358/74 X |
| 4,587,566 | 5/1986 | Hinn | 358/242 |
| 4,599,642 | 7/1986 | Willis | 358/74 X |
| 4,660,093 | 4/1987 | Craig et al. | 358/243 |
| 4,692,793 | 9/1987 | Tamura et al. | 358/74 X |
| 4,748,497 | 5/1988 | Sengoku | 358/74 X |

OTHER PUBLICATIONS

Patent Abstracts of Japan, vol. 9, No. 136 (E-320) Jun. 12, 1986, & JP-A-60018086, (Toshiba K.K.) Jan. 30, 1985.

Primary Examiner—Mark R. Powell
Assistant Examiner—John W. Miller
Attorney, Agent, or Firm—Wolf, Greenfield & Sacks

[57] ABSTRACT

A method for detecting the warm-up of a television CRT includes the following steps during a warm-up phase of the tube: providing the CRT with warm-up signals during predetermined line periods at the initial portion of frames; and detecting the cathode current of the tube during the occurrence of windows in correspondence with the predetermined line periods in order to enable black level regulation loops. The windows have a width smaller than a line period and are approximately centered on the line periods.

19 Claims, 4 Drawing Sheets

MODIFIED BLACK-LEVEL REGULATION BASED ON WARM UP DETECTION OF CRT

BACKGROUND OF THE INVENTION

1. Field of the Invention

The present invention relates to circuits for controlling television cathode ray tubes (CRT's), and more particularly to a circuit operable for indicating that the CRT has reached a sufficient warm-up level when a television set is powered.

2. Discussion of the Related Art

FIG. 1 schematically shows a control stage of one of the three cathodes of a color CRT, for example, a red cathode (R). The circuit includes a PNP transistor QR whose emitter is connected to the red cathode (not shown) and whose collector is grounded through a shunt resistor ($R_s$). The base of transistor QR is controlled by an amplifier 10 which receives a current $I_R$ acting as a red channel signal, and a correction current $I_{OR}$ for the correction of a black level. The correction current $I_{OR}$ is provided by a voltage-current converter 12 whose input voltage is the voltage at the terminals of a capacitor C1. The voltage across capacitor C1 is fixed by a differential amplifier 14 which receives at a first input terminal, a reference voltage $V_{ref}$ and at a second input terminal, the voltage across resistor $R_s$, i.e., an indication of the cathode current $I_K$.

Converter 12, capacitor C1, and amplifier 14 form a so-called black level regulation loop. The regulation loop periodically re-adjusts the correction signal $I_{OR}$ so that the black level of the input signal $I_R$ corresponds with the black level of the corresponding cathode.

The black level regulation loop is enabled, as will be seen in more detail with reference to FIG. 3A, during the duration of a line at each initial portion of the frame and disabled during the remaining duration of the frame. Such a short regulation phase allows for storing in capacitor C1 a correction voltage, changed into the correction current $I_{OR}$, serving during the remaining portion of the frame. The possibility of enabling and disabling the regulation loop is symbolized by a switch k1 disposed between capacitor C1 and amplifier 14. The regulation loop is enabled by a signal $EN_R$ that is filtered by an AND gate 16 so that the regulation loop can be enabled only after a warm-up phase of the CRT. The final portion of the warm-up phase is defined by a circuit 18 operable for detecting a warm CRT by measuring the current of cathode $I_K$. The output terminal 19 of circuit 18 is connected to an input terminal of the AND gate 16.

Circuits similar to those that have been described are associated with a transistor QG operable for controlling the green cathode, and with a transistor QB for controlling the blue cathode. The regulation loops associated with the green and blue cathodes are enabled by respective signals $EN_G$ and $EN_B$ that are provided to input terminals of AND gates 20 and 21. The same resistor $R_s$ serves to measure the sum of the three cathode currents $I_{KR}$, $I_{KG}$, and $I_{KB}$. Similarly, only the detection circuit 18 is operable for determining the end of the warm-up phase and for allowing transmission of the enabling signals $EN_R$, $EN_G$, and $EN_B$.

FIG. 2 is a schematic of a typical circuit 18 for warm-up detection. The voltage across resistor $R_s$ feeds a first input terminal of a comparator 24, a second input terminal receiving the reference voltage $V_{ref}$. The output $V_c$ of comparator 24 is applied to the set input S of an RS-type flip-flop 26. The reset input R of flip flop 26 is connected to a reset circuit (RST) 28 at powering. The output $V_c$ of comparator 24 is transmitted to flip flop 26 only during each of the three black level regulation phases, i.e., during the activation of each signal $EN_R$, $EN_G$ and $EN_B$, which is represented by a switch k2 disposed between the output of comparator 24 and flip-flop 26 and controlled by an OR gate 29 receiving at its input signals $EN_R$, $EN_G$, and $EN_B$. The role of a low-pass filter, including resistor R2 and capacitor C2, disposed between the shunt resistor $R_s$ and the input of comparator 24, will be described below.

FIG. 3A shows waveforms of various signals during a warm-up phase of the CRT and during a normal phase. A signal $H_{rt}$ is shown in the form of pulses corresponding to line retraces, and a signal $V_{rt}$ have long-duration pulses corresponding to frame retraces. Corresponding with signals $H_{rt}$ and $V_{rt}$ are the signals enabling the regulation loop $EN_R$, $EN_G$, and $EN_B$; input signals $I_R$, $I_G$, and $I_B$ of the three control circuits of the cathode; and voltage $V_R$ appearing across the shunt resistor $R_s$.

The pulses of signal $H_{rt}$ successively occur within a period of 64 microseconds. The pulses are separated by periods of 52 microseconds corresponding to line periods. The line periods are numbered 1, 2, 3 . . . in the vicinity of signal $H_{rt}$. A first series of periods 1, 2, 3 . . . on the left-hand portion of the drawing corresponds to a warm-up phase of the CRT; a second series 1, 2, 3 . . . on the right-hand portion of the drawing corresponds to a normal phase. Signals $H_{rt}$, $V_{rt}$, $EN_R$, $EN_G$, and $EN_B$ remain identical during the warm-up and normal phases.

Time $t_0$ corresponds to an initial portion of a line retrace and to the beginning of a frame. The frame retrace signal $V_{rt}$ goes from a high state to a low state and remains at the low state for the duration of the frame. Signals $EN_R$, $EN_G$ and $EN_B$ go through an active state respectively during line periods 1, 2, and 3, and then remain inactive until the next frame.

During a warm-up phase, the enable signals $EN_R$, $EN_G$, and $EN_B$ generate measurement windows in which it is determined whether the current of cathode $I_K$ reaches a sufficient level. During a normal phase, these signals generate windows during which are carried out regulations of the black level for each red, green and blue channel.

The current signals $I_R$, $I_G$, and $I_B$ provided to the control circuits of the cathode are low level pulses during line retraces, and are at a constant level during the frame retraces. From line 4, the current signals exhibit variations corresponding to the image to be displayed on the screen. These variations are imperceptible on the screen as long as the CRT has not reached its nominal operating condition.

During a warm-up phase, as represented on the left-hand portion of FIG. 3A, the current signals have a relatively high level during the generation of the windows corresponding to the enable signals, for rapidly enabling the CRT. The cathode current progressively and gradually increases during the line periods 1, 2, and 3. At a time preceding the initial portion of the frame shown in the right-hand portion of FIG. 3A, the current of the cathode reaches the black level corresponding to a voltage having a value $V_{ref}$ across resistor $R_s$. At this time, the output signal $V_c$ of comparator 24 (FIG. 2) switches to high state and is transmitted, since a measurement enable window is generated, to the set input S of flip-flop 26. Then, flip-flop 26 authorizes the validation of the regulation loops of the black level during the subsequent enable windows.

On the right-hand portion of FIG. 3A (normal phase), each of the current signals has, during a corresponding enable window, a so-called "black level" or reference level. As shown by curve $V_R$, the cathode current is regulated to a value corresponding to voltage $V_{ref}$ during the generation of enable windows.

The first lines of a frame, especially lines 1, 2, and 3, are not visible on the screen. This is the reason why the black level regulation and the warm-up phase of the CRT are carried out during these line periods. It is essential that the black level regulation be inhibited during the warm-up phase, because the difference between the actual cathode current and the desired value would cause, during the first frames at powering, high correction currents $I_{OR}, I_{OG}, I_{OB}$. Such high correction currents would generate unpleasant visual effects.

FIG. 3B shows the actual waveform of voltage $V_R$ across resistor $R_s$, as well as the corresponding waveform of the output signal $V_c$ of comparator 24. At each initial and final portion of a line period, voltage $V_R$ exhibits a high positive peak. Such voltage peaks, that are present in the measurement windows, can exceed voltage $V_{ref}$. As represented, the output signal $V_c$ of comparator 24 switches to a high state in the measurement windows during each voltage peak, whereas the mean voltage $V_R$ has not reached value $V_{ref}$ yet. Thus, flip-flop 26 may be enabled and the black level regulation loops may start operating prematurely.

The low-pass filter R2-C2 of FIG. 2 is designed to avoid this drawback. However, to sufficiently attenuate the positive voltage peaks, capacitor C2 must have a high value (approximately equal to a few microfarads). The present trend is to integrate most of the elements of the television circuits. Since capacitor C2 cannot be integrated, a specific pin 30 (FIG. 2) of the integrated circuit must be provided to connect capacitor C2. Additionally, capacitor C2 and its mounting involve non-negligible costs.

SUMMARY OF THE INVENTION

An object of the invention is to provide a circuit for the warm up detection of CRT's that does not require any device, especially any capacitor, for attenuating voltage peaks.

In order to detect the fact that the cathode current has reached its black level value, the invention uses windows having a width smaller than a line period. The windows are approximately centered on the line periods so that voltage peaks occur outside these windows.

The invention is particularly directed to a method for detecting warm up of a TV tube including the following steps during a warm-up phase of the tube: providing to the tube, during predetermined line periods at the initial portion of the frame, warm-up signals; and detecting the cathode current of the tube during the occurrence of windows in coincidence with the predetermined line periods in order to enable the black level regulation loops. The windows have a width smaller than a line period and are approximately centered on the line periods.

The line periods preferably have a 52-microsecond duration, and windows have a 32-microsecond duration and are centered on the line periods.

The invention also provides a circuit for warm up detection of a TV tube including a flip-flop having an output terminal coupled to a black level regulation loop of the black level cathode current and a comparator which is enabled when the windows are generated. The comparator is connected to the flip-flop to enable it when the cathode current reaches the black level during a warm-up phase while warm-up signals are provided to the tube during predetermined line periods. According to the invention, the circuit includes means for generating, during the line periods, windows having a time period shorter than the line periods and approximately centered on these periods.

According to an embodiment of the invention, the means for generating windows includes an Exclusive-NOR gate receiving at its inputs a signal having a 50%-duty cycle at the line frequency and a signal having a 50%-duty cycle at twice the line frequency, these input signals being generated by frequency dividers included in a phase locked loop for synchronizing signals with an external signal.

BRIEF DESCRIPTION OF DRAWINGS

The foregoing and other objects, features, aspects and advantages of the invention will become apparent from the following detailed description of the present invention when taken in conjunction with the accompanying drawings.

DETAILED DESCRIPTION

According to the invention, to enable the black level regulation loops, the output state of comparator 24 (FIG. 2) is taken into account during windows centered approximately on the line periods, but having a width smaller than a line period. Thus, erroneous states of the output of comparator 24 occurring at the initial and end portions of the line periods are not taken into account.

Figure 1:
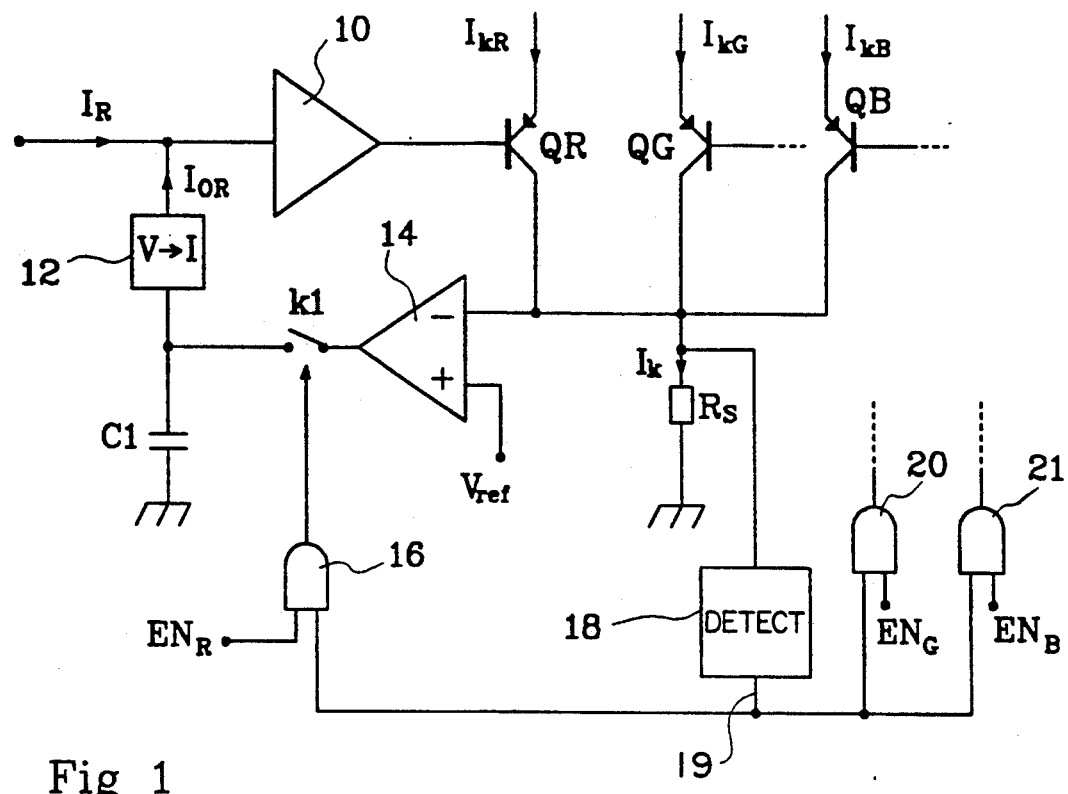
FIG. 1 is a schematic of a conventional circuit for controlling a cathode including a black level regulation loop.
Figure 2:
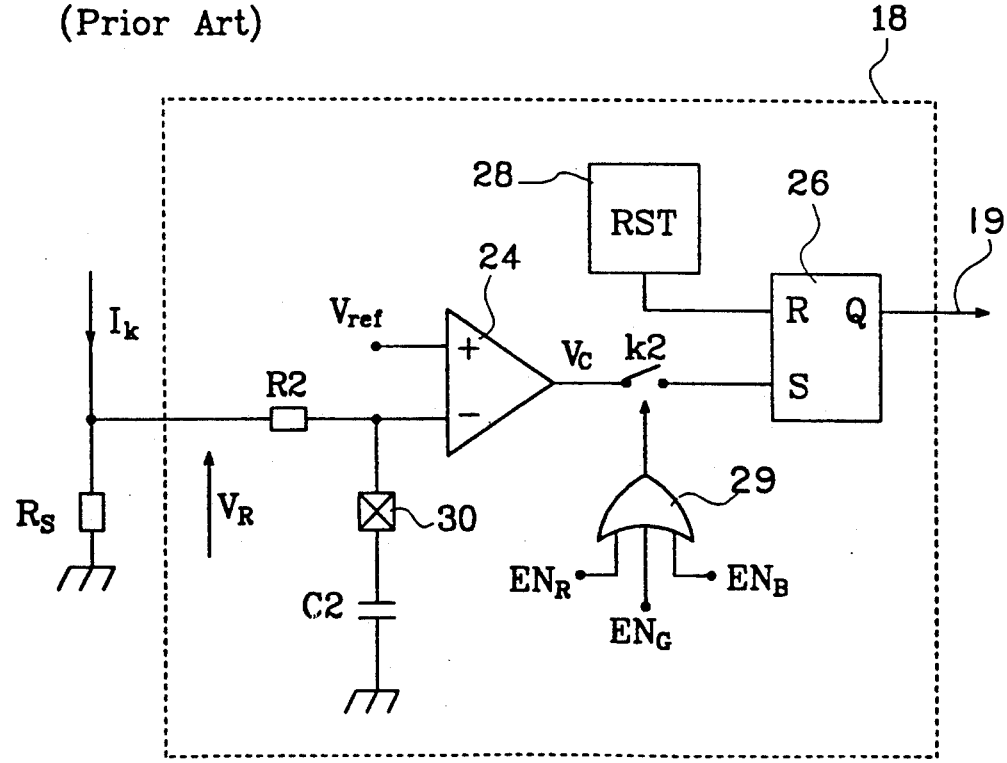
FIG. 2 is a schematic of a conventional black level detection circuit.
Figure 4A:
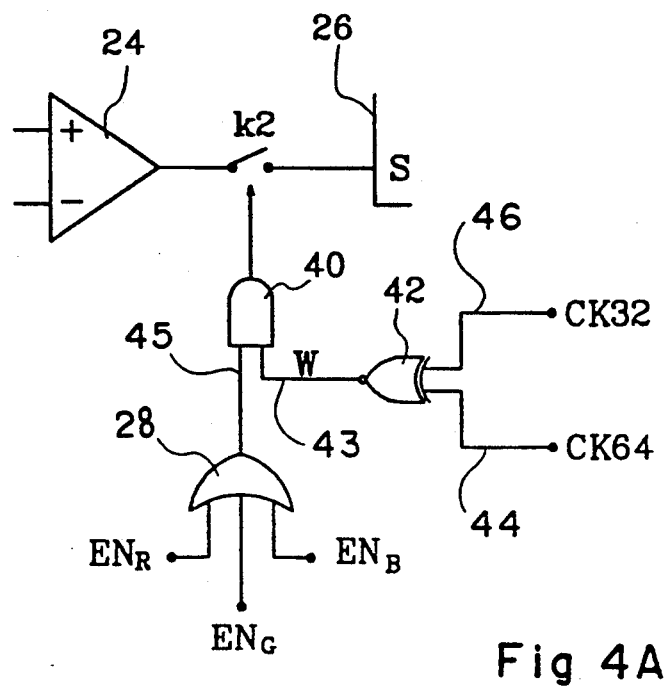
FIG. 4A is an embodiment of a circuit for generating measurement windows having a reduced width, according to the invention.

FIG. 4A schematically shows a circuit for controlling switch k2 disposed between comparator 24 and flip-flop 26 as shown in FIG. 2. According to the invention, an AND gate 40 controls switch k2 and receives, at a first input terminal 43, an output signal W of an Exclusive-NOR gate 42. A first input terminal 44 of gate 42 receives a clock signal CK64 having a 50%-duty cycle and a 64-microsecond period (the line period). A second input terminal 46 of gate 42 receives a clock signal CK32 having a 50%-duty cycle and a 32-microsecond period. Signal CK64 is provided from signal CK32 by a divider by 2. Additionally, signals CK32 and CK64 are synchronized with respect to the line retrace signal $H_{rt}$.

Figure 4B:
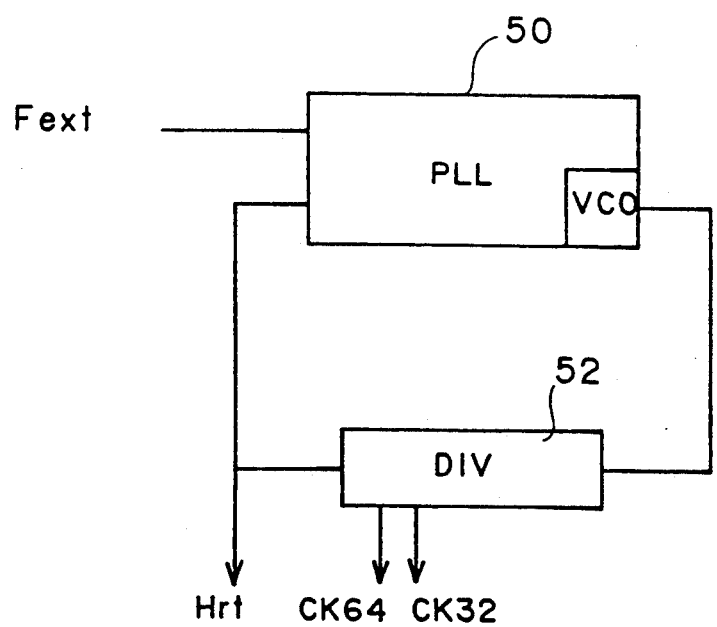
FIG. 4B shows conventional circuitry delivering necessary signals.

FIG. 4B shows part of the internal circuitry of a conventional horizontal deflection processor, such as the SGS-Thomson STV2110, which comprises a phase locked loop (PLL) 50 for synchronizing the line retrace signal $H_{rt}$ with an external signal Fext. The PLL includes a 500-kHz controlled oscillator (VCO) followed by a divider 52, having several stages of which two provide the desired signals CK32 and CK64. The specific waveform of the line retrace signal $H_{rt}$ (pulses of 12 microseconds, separated by time intervals of 54 microseconds) is generated by the last stage of the divider, such that the pulses are approximately centered on the rising edges of signal CK64.

Additionally, an OR gate 28 receives the enabling signals as inputs, and provides an output to a second input terminal 45 of AND gate 40. Thus, the periodic windows signal W provided by gate 42 is supplied to switch k2 only when necessary, that is, during the first three lines of a frame.

Figure 3A:
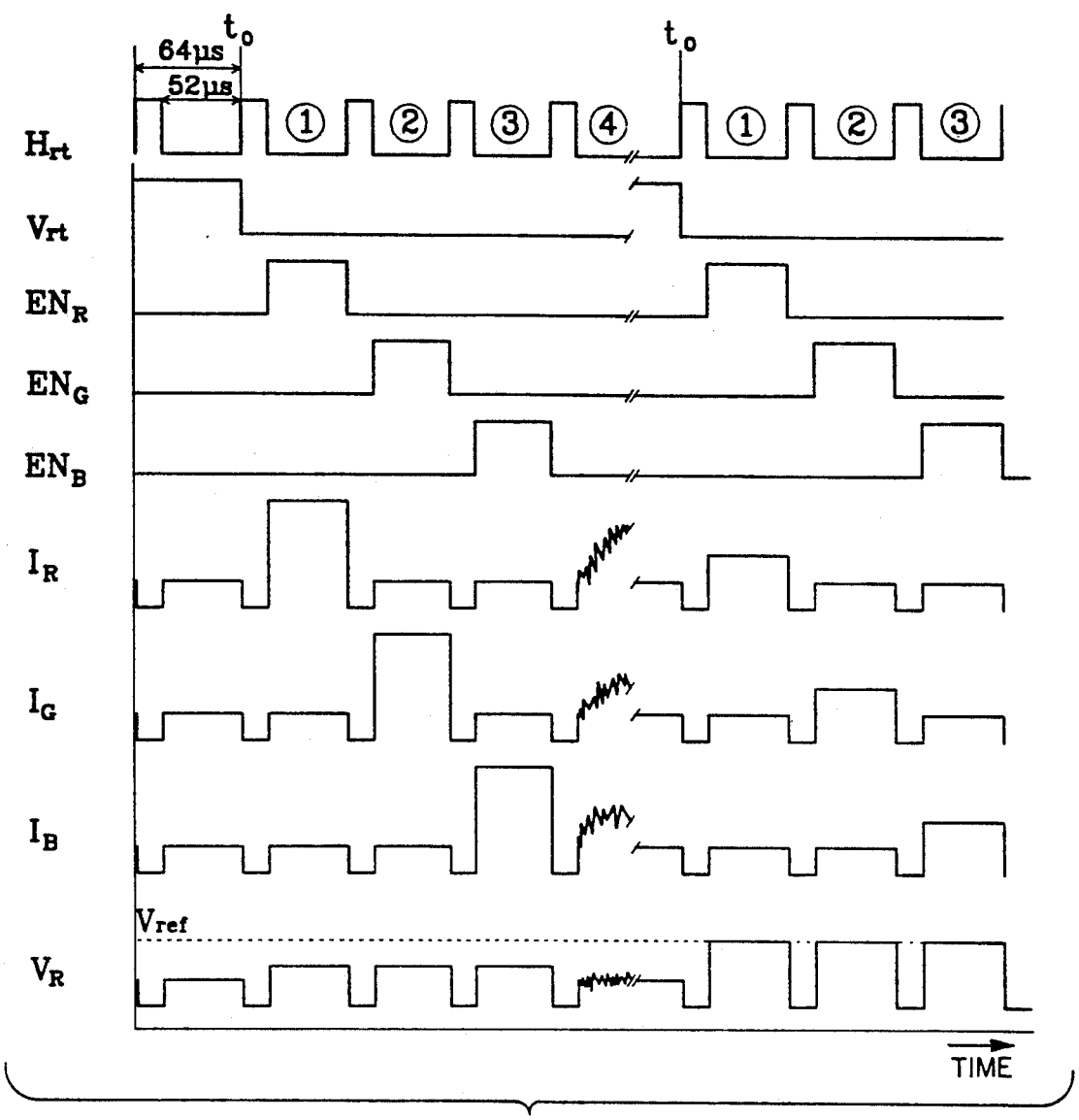
FIGS. 3A and 3B show various signals of parameters in the circuits of FIGS. 1 and 2 during a warm-up phase of the CRT and during a normal phase.
Figure 3B:
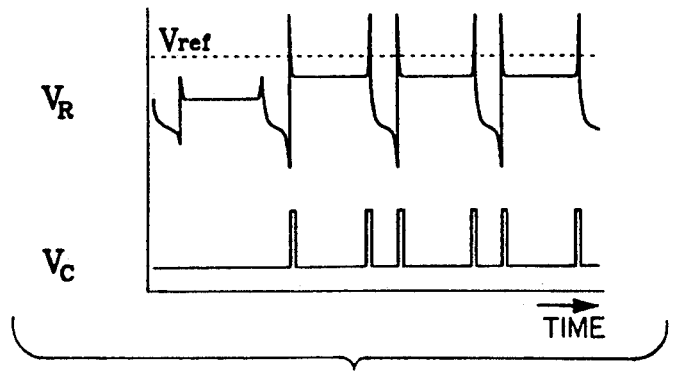
Figure 5:
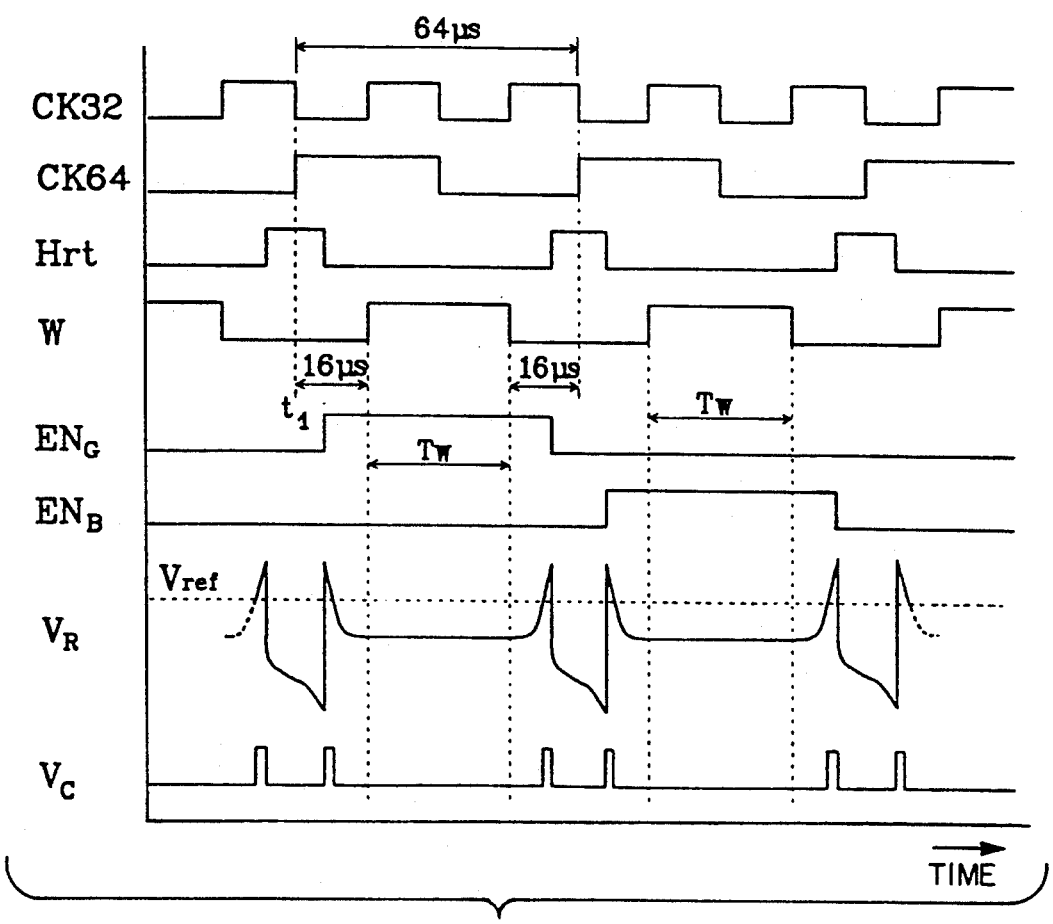
FIG. 5 shows signals used according to the invention for generating, with the circuit of FIG. 4, measurement windows having a reduced width.

FIG. 5 shows the waveforms of signals CK32, CK64, $H_{rt}$, and W, enabling signals $EN_G$, $EN_R$, voltage $V_R$ across resistor $R_s$, and the output signal $V_c$ of comparator 24, during a warm-up phase as shown on the left-hand portion of FIGS. 3A and 3B. At time $t_1$, both a rising edge of signal CK64 and a falling edge of signal CK32 occur. A pulse from signal $H_{rt}$ is centered on time $t_1$. The output of the Exclusive-NOR gate 42 is high when signals CK32 and CK64 are both high or both low. This situation occurs 16 microseconds after the occurrence of a rising edge of signal CK64 until 16 microseconds preceding the next rising edge of signal CK64. The rising edges of signal CK64 coincide with the middle of the pulses of signal $H_{rt}$. Thus, windows signal W has a window width $T_w$ smaller than a line period, i.e., the period between a falling edge of signal $H_{rt}$ and the next rising edge, and the windows are approximately centered on the line periods. Under these conditions, as shown in FIG. 5, the output of comparator 24 is enabled (switch k2 is on) during periods $T_w$ when the comparator is not in an active state.

As is apparent to those skilled in the art, various modifications can be made to the above disclosed preferred embodiments, more particularly for the generation of windows signal W. For example, windows signal W can be generated by two monostable circuits disposed in series, the first one being enabled by a pulse of the line retrace signal. If the pulses of signal $H_{rt}$ are centered on the falling edges of signal CK64, an Exclusive-OR gate should be chosen for gate 42.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. A method for detecting the warm-up of a television cathode ray tube (CRT) during a warm-up phase of the tube, the method comprising the steps of:
    providing a black level regulation loop;
    providing the CRT with warm-up signals during predetermined line periods at an initial portion of frames;
    providing a windows signal having windows which have a width smaller than a line period and are approximately centered on the line periods;
    detecting the cathode current of the tube during the windows; and
    providing a signal to enable the black level regulation loop in response to the cathode current and the windows signal.

2. The method of claim 1, wherein the line periods have a duration of about 52 microseconds, and wherein the windows have a duration of about 32 microseconds.

3. The method of claim 1 wherein the step of providing a windows signal comprises receiving and logically combining two clock signals, one of which has a frequency which is the same as the frequency of the predetermined line periods.

4. The method of claim 1 wherein the step of detecting comprises providing a comparator for receiving a voltage based on the cathode current, for receiving a reference voltage indicating a black level, and for providing an output signal indicating whether the cathode current exceeds the black level.

5. The method of claim 4 wherein the step of providing a signal comprises coupling the output signal of the comparator to the black level regulation loop.

6. The method of claim 5 wherein the step of coupling the output signal comprises providing a flip-flop having an input terminal coupled at selective times to the comparator to receive the output signal, and an output terminal coupled to the black level regulation loop.

7. A circuit for detecting the warm-up of a television tube and for enabling a black level regulation loop during a warm-up phase while warm-up signals are provided to the tube during predetermined line periods, the circuit comprising:
    a flip-flop having an output terminal coupled to the black level regulation loop;
    a comparator having
    an input terminal for receiving an input signal indicating a cathode current, and
    an output terminal;
    means for generating a windows signal having windows which have a width smaller than the line periods, the windows being approximately centered on the line periods; and
    switching means for coupling the output terminal of the comparator to the input terminal of the flip-flop to enable the black level regulation loop when the cathode current reaches a predetermined level during a window.

8. The detection circuit of claim 7, wherein the means for generating a windows signal comprises:
    a phase locked loop having frequency dividers for providing a first signal having a 50%-duty cycle at the line period frequency and a second signal having a 50%-duty cycle at twice the line period frequency;
    an Exclusive-NOR gate which receives the first and second signals, the phase locked loop circuit for synchronizing the first and second signals with an external signal.

9. The detection circuit of claim 7 wherein the means for generating includes logic circuitry for receiving and combining a plurality of signals, and the switching means comprises logic circuitry for combining the line periods and the windows signal and for providing an output signal to the switching means.

10. A warm-up detection circuit for detecting the warm-up of a television tube and for enabling a regulation loop when a cathode current reaches a black level during a warm-up phase while warm up signals are provided to the tube during predetermined line periods, the circuit comprising:

means for generating a windows signal including windows having an active state width smaller than the line periods and having transitions to and from the active state during the line periods;

means for detecting the cathode current; and means, operable during the occurrence of a window, for enabling the black level regulation loop in response to the detected cathode current.

11. The circuit of 10 wherein the means for detecting comprises a comparator having a first input terminal for receiving a voltage based on the cathode current, a second input terminal for receiving a reference voltage based on the black level, and an output terminal.

12. The circuit of claim 11 wherein the means for enabling includes a flip-flop having an input terminal, and a switching means coupled between the input terminal of the flip-flop and the output terminal of the comparator, wherein the switching means is activated during a window.

13. The circuit of claim 10 wherein the means for generating windows comprises logic circuitry for receiving and combining a first signal having a 50%-duty cycle at the line period frequency and a second signal having a 50%-duty cycle at twice the line period frequency.

14. The circuit of claim 13 wherein the logic circuitry comprises an Exclusive-NOR gate.

15. The circuit of claim 10 wherein the line periods are about 52 microseconds, and the windows are about 32 microseconds, and wherein the windows signal has the same frequency as the line periods.

16. The circuit of claim 10 wherein the means for generating a windows signal comprises two monostable circuits disposed in series.

17. A method for detecting the warm-up of a television cathode ray tube (CRT) during a warm-up phase of the tube and for activating a black level regulation loop, the method comprising the steps of:

providing a frame retrace signal;

providing a line retrace signal having an on state with a pulse, and an off state corresponding to line periods;

providing a first enabling signal for a color cathode, the first enabling signal having an active state during a line period during a frame retrace;

providing a windows signal having a window which occurs during the active state of the enabling signal, the window having a width which is less that the width of the active state of the enabling signal, and which is centered intermediate transitions to and from the active state of the enabling signal;

logically combining the window signal and the enabling signal to provide an activation signal; and activating the black level regulation loop in response to the activation signal.

18. The method of claim 17 wherein the step of providing a windows signal comprises receiving, delaying, and dividing the line retrace signal to form two signals, and combining the two signals.

19. The method of claim 17 further comprising the steps of:

providing a second enabling signal for a second color cathode, the cathode having an active state during a line period during a frame retrace;

providing a third enabling signal for a third color cathode, the cathode having an active state during a line period during a frame retrace; and logically combining the first, second, and third enabling signals and providing a combined output;

wherein the windows signal provides a window during each enabling signal, and wherein the step of logically combining the windows signal comprises combining the windows signal and the combined output to provide the activation signal, so that the activation signal is provided three times during each frame retrace.

* * * * *